July 19, 1927.　　　　B. R. BENJAMIN ET AL　　　　1,636,276

TRACTOR DRAWBAR

Filed April 9, 1924

Inventors.
Bert R. Benjamin
and Clemma R. Raney,
By
Atty.

Patented July 19, 1927.

1,636,276

UNITED STATES PATENT OFFICE.

BERT R. BENJAMIN, OF OAK PARK, AND CLEMMA R. RANEY, OF RIVERSIDE, ILLINOIS, ASSIGNORS TO INTERNATIONAL HARVESTER COMPANY, OF CHICAGO, ILLINOIS, A CORPORATION OF NEW JERSEY.

TRACTOR DRAWBAR.

Application filed April 9, 1924. Serial No. 705,204.

This invention is directed to improvement in construction of farm tractors, more particularly in the rear portion of the frame and in the means for coupling various implements thereto.

The principal objects of the invention are to provide, on tractors of the type having an arched or raised rear frame structure, a draw bar that will receive the draft coupling of practically any farm machine or vehicle and that will, while serving as a draw bar, also act as a transverse brace for the lower portions of the arched tractor frame.

The foregoing and other minor objects are attained by providing a rigid, transversely extending bar, preferably of wide U-shape, having its arms detachably connected to studs on the lower inner sides of the vertical housing at each side of the tractor, the bar being of a novel form providing draft coupling depressions at each side of the machine and being adjustably connected to the tractor by novel means.

Referring to the drawing,—

Figure 1:
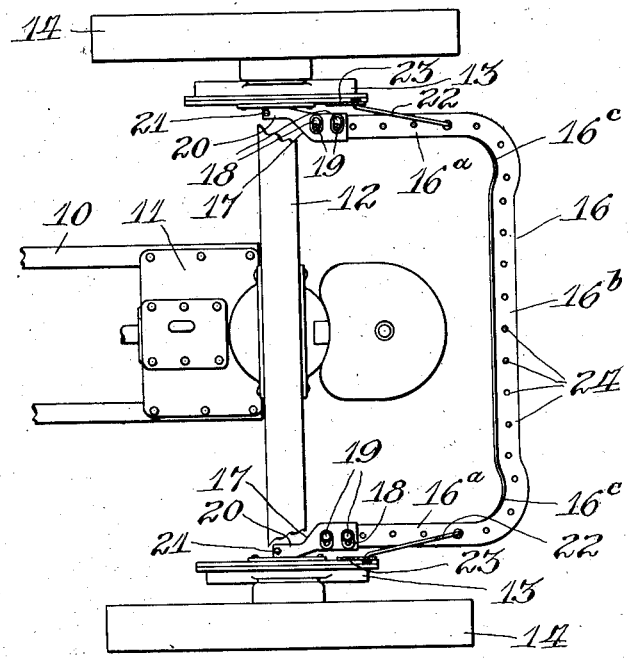
Fig. 1 is a plan view of the rear end of a tractor with the differential shaft housing broken away to show the draw bar connections.

The invention is illustrated in connection with a tractor of the type having a comparatively narrow central frame or body 10, on the rear end of which is mounted the housing 11 enclosing the transmission and differential gearing. The rear portion of housing 11 has lateral extensions 12 in which are the two parts of the differential drive shaft. At the end of each lateral extension 12 there is secured a downwardly extending housing 13 enclosing a large gear which is in mesh with and driven by the differential shaft in the housing 12. The gears in the housings 13 are fixed to the traction wheels 14 which are driven thereby.

The construction and arrangement of housings just described provides a wide upwardly arched portion of the tractor frame at the rear, as preferred for farm tractors intended to pass over growing plants, the tractor illustrated in the drawing being of the wide tread type with the rear adapted to straddle two rows of corn or other row crop.

Figure 3:
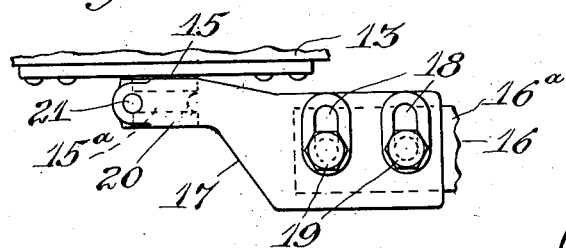
Fig. 3 is a detail plan view of one of the coupling brackets.
Figure 2:
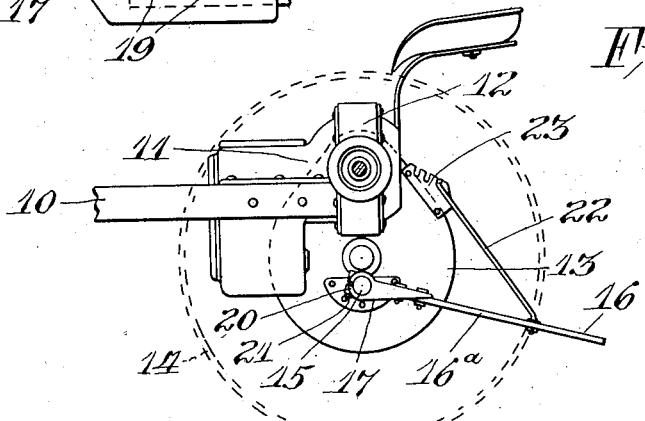
Fig. 2 is a similar side view.
Figure 4:
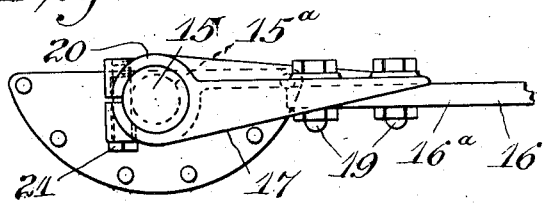
Fig. 4 is a similar view from the side.

On the lower, inner portions of each of the housings 13 there are provided inwardly projecting, cylindrical studs 15, which serve as supporting elements for the transversely extending U-shaped draw bar 16. The bar 16 is preferably formed from a rigid, flat metal bar bent into a wide U-shape, as shown in Fig. 1, and having its arms 16ª extending laterally at right angles to its straight transverse bight portion 16ᵇ. The draw bar is designed to extend rearwardly from the tractor and to be adjustably secured thereto in the following manner:

On the ends of each of the arms 16ª, there is mounted a coupling bracket 17 having a widened rear portion provided with a pair of transversely extending slots 18 receiving fastening bolts 19, which pass through the forward ends of the arms 16ª (Fig. 3). When these bolts are loosened, the bracket 17 can be shifted laterally on the end of the arm. At its forward end each bracket 17 is formed with a pivot head 20 which is preferably split and formed with a circular opening adapted to receive studs 15. In order to retain the pivot head on the stud and permit pivotal adjustment, each stud is provided with a peripheral groove 15ª, and a screw threaded locking bolt 21 is passed through openings in the end of the head 20, which register with the groove in the stud. It will be evident that brackets 17 can be readily attached or detached from the studs 15 by removing bolts 21 and loosening the bolts 19 on one of the brackets, thereby permitting the bracket to be shifted laterally away from the stud 15 whereupon the bracket on the other arm of the draw bar becomes removable also. As means for supporting the draw bar in desired position, there is provided a pair of suspension links 22, one of which is located at each side of the tractor. These connect an intermediate portion of each arm 16ª with a bracket 23 on the upper part of the housing 13, this bracket being provided with a series of notches in which the upper hooked end of the link 22 may be engaged (Fig. 2). The bar 16 is designed to permit attachment of a wide variety of implements thereto, and, for this purpose, it is provided with spaced apertures 24 from end to end of the bar, which are intended for reception of coupling bolts or pins to permit an implement clevis to be attached at any point in the length of the bar. In order to afford seats for implements employing hooked draft couplings, the bar 16 is formed with its intermediate portion 16ᵇ preferably straight and extending between depressed portions 16ᶜ formed at the two inner angles of the bar. The depressions 16ᶜ are preferably rounded and are adapted to receive and retain in proper position the coupling element, such as a clevis or hook, of any implement that is to be drawn at one side of the tractor, such for instance as a corn planter, and this coupling will be free to slide to the opposite corner of the bar, and be retained there, when the tractor is turned at the end of the row to travel back across the field, as necessary to obtain proper spacing of rows.

The draw bar structure above described not only provides a hitch capable of use with farm machines of practically any type, but also provides a rigid, transverse brace engaging the lower portions of the arched construction embodied in the housings 11, 12 and 13, thereby materially reinforcing the rear end of the tractor frame and enabling it to withstand the strains incident to the operation of the implements secured to the draw bar, this constituting an important feature of the invention. Of course, when the tractor is used as a tractor cultivator for cultivating high plants, the arched axle affords the necessary clearance to prevent injuring the plants. To maintain this advantage of an arched rear axle it is necessary also to raise the draft bar a substantial distance and this is accomplished by providing substitute suspension links 22 of shorter length than those disclosed in the drawings. Such change can be readily and quickly made as will be obvious.

The above description sets forth the preferred form of the invention, but it is evident that the structure is subject to modifications which may be made without departure from the scope of the invention as defined in the following claims.

What is claimed as new is:

1. The combination with a tractor having an upright arched axle structure comprising an axle housing and depending gear housings at each end thereof and traction wheels mounted on the outer sides of said gear housings, of a rigid rearwardly extending U-shaped draw bar, the arms of which are pivotally connected to the inner sides of said gear housings, means included in said pivotal connections for preventing lateral movement of the draw bar with respect to the axle structure, and adjustable suspension means between the axle structure and the draw bar.

2. The combination with a tractor having an upwardly arched rear frame portion and traction wheels mounted on the outer sides thereof, of opposite supporting studs on the lower inner portions of said arch, a rigid rearwardly projecting U-shaped draw bar having its arms provided with bearing brackets pivoted on said studs and contacting the inner sides of the arched portion, and means for holding the draw bar in position.

3. The combination with the rear of a tractor frame, of a transverse, rearwardly projecting, U-shaped draw bar, and connections between the frame and draw bar comprising horizontally projecting studs on the frame and coupling brackets shiftably mounted on the arms of the draw bar, said brackets including parts engaging the studs and being removable therefrom through shifting of the coupling brackets.

4. The combination with the rear of a tractor frame, of a transverse, rearwardly projecting, U-shaped draw bar, and connections between the frame and draw bar comprising horizontally projecting studs on the frame and laterally shiftable coupling brackets mounted on the arms of the draw bar and pivotally engaging said studs, when shifted to one position and rigid suspension links extending from an intermediate point on the arms of the draw bar to selective points of connection on the tractor frame.

5. A draw bar for tractors comprising a U-shaped bar the arms of which are provided with laterally shiftable brackets adapted for connection to a tractor, the transversely extending bight portion of the bar being formed to provide depressed seats at the inner angles of the bar, adapted to receive a draft coupling.

6. A draw bar for tractors comprising a U-shaped bar the arms of which are provided with laterally shiftable brackets adapted for connection to a tractor, the transversely extending bight portion of said bar having a central straight portion separating depressions formed at each inner angle of the draw bar and forming seats adapted to retain a draft coupling.

7. A draw bar for tractors comprising a U-shaped bar having parallel arms and coupling elements on said arms adapted to interlock with complemental horizontally projecting elements on a tractor, including means permitting a coupling element on one of the arms to be shifted thereon in the direction of the plane of the draw bar for effecting connection with said complemental elements.

8. A draw bar for tractors comprising a U-shaped member and coupling elements on the arms of the member adapted to interlock with complemental elements on a tractor, including means permitting a coupling element on one of the arms to be shifted with respect thereto for effecting connection with said complemental elements.

9. The combination with a tractor, of a drawbar comprising a flat metal bar with its ends bent in the plane of the bar to form lateral extending arms pivotally connected to the tractor, the part of the bar between said arms consisting of an intermediate straight portion terminating in rounded bends formed in the bar adjacent each arm, said bends being displaced outwardly in the plane of the bar, and means connecting the bar and tractor for supporting the rear of the bar at desired elevation.

In testimony whereof we affix our signatures.

BERT R. BENJAMIN.
CLEMMA R. RANEY.